US010316748B2

(12) United States Patent
Lans

(10) Patent No.: US 10,316,748 B2
(45) Date of Patent: Jun. 11, 2019

(54) MULTILAYER FILTER MEDIA

(75) Inventor: Erik Lans, Trosa (SE)

(73) Assignee: CAMFIL AB, Stockholm (SE)

( * ) Notice: Subject to any disclaimer, the term of this patent is extended or adjusted under 35 U.S.C. 154(b) by 598 days.

(21) Appl. No.: 14/400,835

(22) PCT Filed: May 15, 2012

(86) PCT No.: PCT/EP2012/059061
§ 371 (c)(1), (2), (4) Date: Dec. 23, 2014

(87) PCT Pub. No.: WO2013/170890
PCT Pub. Date: Nov. 21, 2013

(65) Prior Publication Data
US 2015/0122127 A1 May 7, 2015

(51) Int. Cl.
*F02C 7/05* (2006.01)
*B01D 39/16* (2006.01)
*B01D 39/20* (2006.01)
*B01D 46/00* (2006.01)
*B01D 46/54* (2006.01)

(52) U.S. Cl.
CPC ............ *F02C 7/05* (2013.01); *B01D 39/1623* (2013.01); *B01D 39/1692* (2013.01); *B01D 39/2017* (2013.01); *B01D 46/0023* (2013.01); *B01D 46/543* (2013.01); *B01D 2239/0435* (2013.01); *B01D 2239/064* (2013.01); *B01D 2239/065* (2013.01); *B01D 2239/1233* (2013.01)

(58) Field of Classification Search
CPC .. B01D 46/23; B01D 46/543; B01D 39/1623; B01D 39/1692; B01D 2239/64–2239/65; B01D 2239/435; B01D 2239/1233; B01D 39/2017; B01D 46/0023; B01D 2239/064; B01D 2239/065; B01D 2239/1633; F02C 7/05
See application file for complete search history.

(56) References Cited

U.S. PATENT DOCUMENTS 4,030,639 A 6/1977 Parish et al.
4,904,385 A * 2/1990 Wessling ............. B01D 39/163 210/490
4,917,714 A * 4/1990 Kinsley, Jr. ........ B01D 39/1623 162/146

(Continued)

FOREIGN PATENT DOCUMENTS

WO WO-2011022382 A2 2/2011

OTHER PUBLICATIONS

Chinese Office Action dated Apr. 1, 2016.
International Search Report PCT/ISA/210 for International Application No. PCT/EP2012/059061 dated May 15, 2012.

*Primary Examiner* — Jason M Greene
(74) *Attorney, Agent, or Firm* — Harness, Dickey & Pierce, P.L.C.

(57) ABSTRACT

A filter media is disclosed for removing particles from an air stream. The filter media, in an embodiment, includes a porous membrane layer and a pre-filter layer including a downstream surface and an upstream surface. The pre-filter layer is arranged with the downstream surface adjacent an upstream side of the porous membrane layer. The pre-filter layer includes a wet laid composite media having a mixture of glass fibers and synthetic fibers. A method for using the filter media in a gas turbine is also disclosed.

17 Claims, 2 Drawing Sheets

(56) References Cited

U.S. PATENT DOCUMENTS

| | | | | |
|---|---|---|---|---|
| 5,728,306 | A * | 3/1998 | Breillatt, Jr. | B01D 39/1623 210/323.1 |
| 7,964,012 | B2 * | 6/2011 | Choi | B01D 39/1692 55/360 |
| 2005/0160711 | A1 * | 7/2005 | Yang | B01D 39/1623 55/524 |
| 2006/0277877 | A1 * | 12/2006 | Shields | B01D 39/16 55/486 |
| 2009/0134089 | A1 * | 5/2009 | Olson | A01K 63/045 210/500.36 |
| 2011/0042316 | A1 | 2/2011 | Chen et al. | |
| 2012/0144790 | A1 | 6/2012 | Cambo et al. | |
| 2014/0130469 | A1 * | 5/2014 | Nagy | B01D 39/1623 55/487 |

* cited by examiner

MULTILAYER FILTER MEDIA

FIELD OF THE INVENTION

The present invention relates to a filter media for removing particles from an air flow and to the use of such filter media in a gas turbine.

BACKGROUND OF THE INVENTION

Gas turbines for e.g. power generation are normally protected by air filters provided in the air intake system. The purpose of these filters is to protect the engine from residue build-up, fouling, on the turbine blades in the compressor stage. This type of accumulation of unwanted material reduces efficiency and increases probability of failure of the gas turbine. Insufficient filter performance can also cause engine corrosion in the decompression stage (hot end corrosion). In the past, it was common to use filters in filter classes F7-F9 (EN779-2002) having a removal efficiency of almost 100% for particles above 3 μm but merely 50-75% for particles sized 0.4 μm and below. It has, however, been revealed that particles having a size below 0.4 μm have a significant impact on both fouling and hot end corrosion and this has lead to an increased demand for filters in higher filter classes. Today, the use of filters of filter class EPA11, removal efficiency of 95% on Most Penetrating Particle Size (MPPS) or even EPA12, removal efficiency of 99.5% on MPPS, is not unusual. A problem with these highly efficient filters is that they have a considerably higher pressure drop. In new installations, this could be compensated for by using a larger filter area to reduce the air flow per area unit. In existing gas turbines, this is not always possible, or at least not feasible for cost reasons and the use of more efficient filters is therefore prevented. New materials allow the combination of high filter efficiency and low pressure drop. Examples of materials are porous membranes of expanded polytetrafluoethylene (ePTFE), ultra high molecular weight polyethylene (UPE) or membranes of electro spun polymer fibers. These types of membranes have in common that they are very thin and have a low fiber density with fine fibers, thus generating large fiber surface area which is a key parameter in achieving high filtration efficiency while not restricting the air flow. These thin membranes are, however, sensitive to damage. Another problem is that the passage of air will be restricted due to agglomeration of particles on the upstream surface of the membrane. The membrane typically has an active filtration thickness between 0.01 mm and 0.1 mm while standard filters made of cellulose or synthetic fibers have a thickness of 0.3-1 mm. The greater depth of the standard filters leads to particle capture within a greater volume such that flow restriction due to particle agglomeration takes longer time to build up. This can be solved by laminating a pre-filter layer on an upstream surface of the membrane that captures a majority of the larger particles (>3 μm) thus reducing the particle agglomeration on the membrane. EP-1674144B1 discloses a system comprising a gas turbine and a filter having a filter media with a porous polymeric membrane and a depth filtration layer comprising electrostatically charged polymeric fibers. The electrostatic charging of the depth filtration layer is done to enhance filter performance. This solution has a number of disadvantages, the most noticeable being the fact that the electrostatic charge of the depth filtration layer is only temporary so that filter efficiency will diminish with over time.

SUMMARY OF THE INVENTION

It is an object of the present invention to provide an improved filter media which eliminates, or at least reduces the above mentioned and other drawbacks. This object and other objects are achieved by a filter media according to the present invention as defined in claim 1 of the appended claims. This object and other objects are also achieved by a use as defined in claim 15 of the appended claims. Preferred embodiments of the present invention are defined in the dependent claims.

Thus, in accordance with an aspect of the present invention there is provided a multilayer filter media for removing particles from an air stream, comprising a porous membrane layer and a pre-filter layer having a downstream surface and an upstream surface. The pre-filter layer is arranged with the downstream surface adjacent an upstream side of the porous membrane layer. The pre-filter layer comprises a wet laid composite media having a mixture of glass fibers and synthetic fibers. This configuration brings a number of advantages with it such as high structural stability and good characteristics in wet environments. The wet laying process used to produce the pre-filter layer prevents the build-up of any electrostatic charge in the pre-filter media, i.e. the pre-filter media is inherently electrostatically uncharged, such that the filtration efficiency will not be reduced due to loss of electrostatic charge over time.

In accordance with an embodiment of the filter media of the invention, the porous membrane layer is laminated to the pre-filter layer. Laminating the two layers provides a reliable interconnection of the layers.

In accordance with an embodiment of the filter media of the invention, a supporting layer is laminated to a downstream side of the porous membrane layer. Such supporting layer will provide further structural stability and can comprise a wet-laid layer of cellulose, synthetic or glass fibers or combinations thereof. Spun bound, air laid or woven materials are also conceivable. If fibers are used in the support layer that may damage the membrane, e.g. glass fibers, it is possible to use an additional, intermediate layer as well to protect the membrane.

In accordance with an embodiment of the filter media of the invention, a majority of the fibers at the downstream surface of the pre-filter layer are synthetic fibers. This has the advantage that the membrane is protected from being punctured by the often sharp glass fibers.

In accordance with an embodiment of the filter media of the invention, a ratio of an amount of synthetic fibers in a given plane parallel to said downstream surface to a total amount of fibers in said plane decreases from the downstream surface of the pre-filter layer towards a centre of said pre-filter layer. This results in a pre-filter layer that protects the membrane from the glass fibers and also protects the often brittle glass fibers from damage during handling of the pre-filter media.

In accordance with an embodiment of the filter media of the invention, a ratio of the amount of synthetic fibers at the downstream surface of the pre-filter layer to the total amount of fibers at the downstream surface of the pre-filter layer is larger than 0.7.

In accordance with an embodiment of the filter media of the invention, a ratio of the amount of synthetic fibers at the upstream surface of the pre-filter layer to the total amount of fibers at the upstream surface of the pre-filter layer is larger than 0.5. By providing an outer layer having a majority of synthetic fibers it will have enhanced surface scratch resistance and the glass fibers are protected from damage during handling of the pre-filter media.

In accordance with an embodiment of the filter media of the invention, in a plane parallel to said downstream surface centrally positioned between the downstream surface and the upstream surface of the pre-filter layer, the ratio of the amount of synthetic fibers to the total amount of fibers is less than 0.5 and a ratio of the amount of glass fibers to the total amount of fibers is larger than 0.5. At the centre of the pre-filter media the glass fibers are protected from damage and can provide excellent mechanical filtration performance.

In accordance with an embodiment of the filter media of the invention, the glass fibers of the pre-filter layer have diameters from 0.01 μm and 50 μm, preferably between 0.1 μm and 0.5 μm.

In accordance with an embodiment of the filter media of the invention, the synthetic fibers of the pre-filter layer have diameters from 0.01 μm and 50 μm, preferably between 0.5 μm and 50 μm.

In accordance with an embodiment of the filter media of the invention, the pre-filter layer is not electrostatically charged. Electrostatically charged filter media typically have very good initial filtration characteristics. However, these characteristics diminish as the electrostatic charge reduces over time. By providing a pre-filter media which is not electrostatically charged, a pre-filter media is obtained that has more consistent filtration properties over its complete lifetime. It is also possible to add a discharge step during the manufacture of the pre-filter layer and/or during the manufacture of the multilayer filter media. This further enhances the consistent characteristics of the filter according to the present invention.

In accordance with an embodiment of the filter media of the invention, the porous membrane layer comprises an ePTFE-membrane. ePTFE has been used for a long time and has proved to comprise the necessary characteristics, e.g. strength against the formation of holes when the filter media is pleated; air permeability; particle filtration efficiency and; handling characteristics.

In accordance with an embodiment of the filter media of the invention, the porous membrane layer comprises an Ultra High Molecular Weight Polyethylene-membrane (UPE). UPE has been shown to constitute an adequate alternative to ePTFE.

In accordance with an embodiment of the filter media of the invention, the porous membrane layer comprises a membrane of spun bound polymer fibers. A membrane made from spun bound polymer fibers has also been shown to constitute an adequate alternative to ePTFE.

In accordance with another aspect of the invention, the use of a multilayer filter media according to any of claims 1 to 14 for removing particles from an air stream in a gas turbine air intake system is described.

Further objects and advantages of the present invention will be discussed below by means of exemplifying embodiments. These and other features, aspects and advantages of the invention will be more fully understood when considered with respect to the following detailed description, appended claims and accompanying drawings.

BRIEF DESCRIPTION OF THE DRAWINGS

The invention will now be described in more detail and with reference to the appended drawings in which.

DESCRIPTION OF PREFERRED EMBODIMENTS

Figure 1:
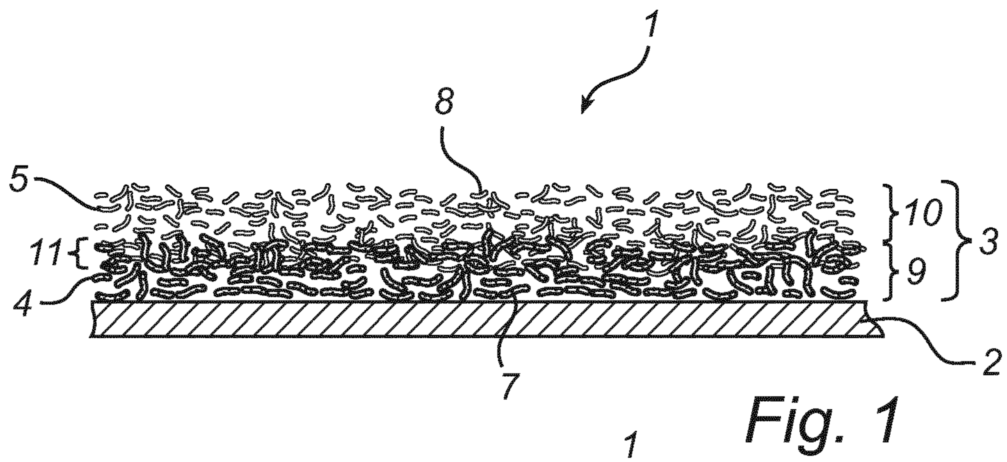
FIG. 1 is a schematic cross-section of a first embodiment of the filter media according to the invention.
Figure 2:
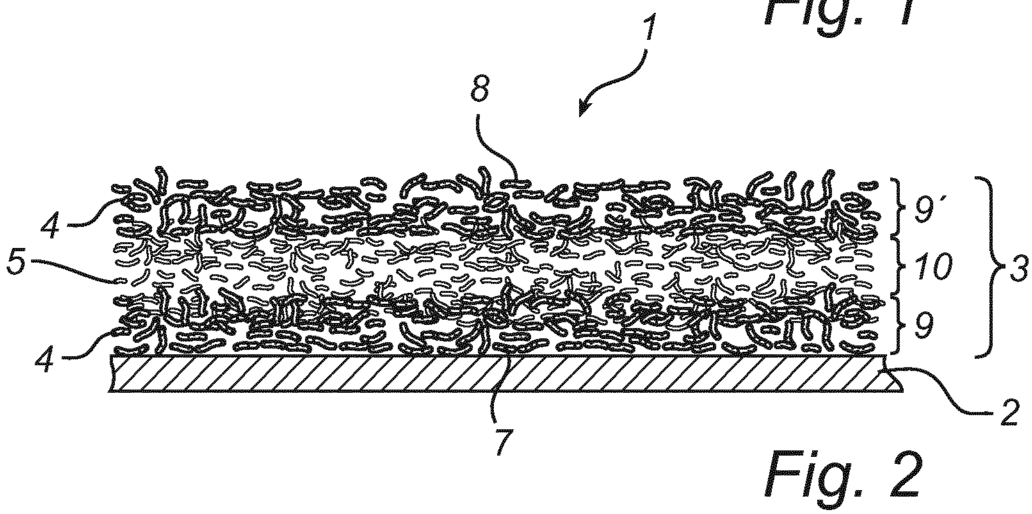
FIG. 2 is a schematic cross-section of a second embodiment of the filter media according to the invention.
Figure 4:
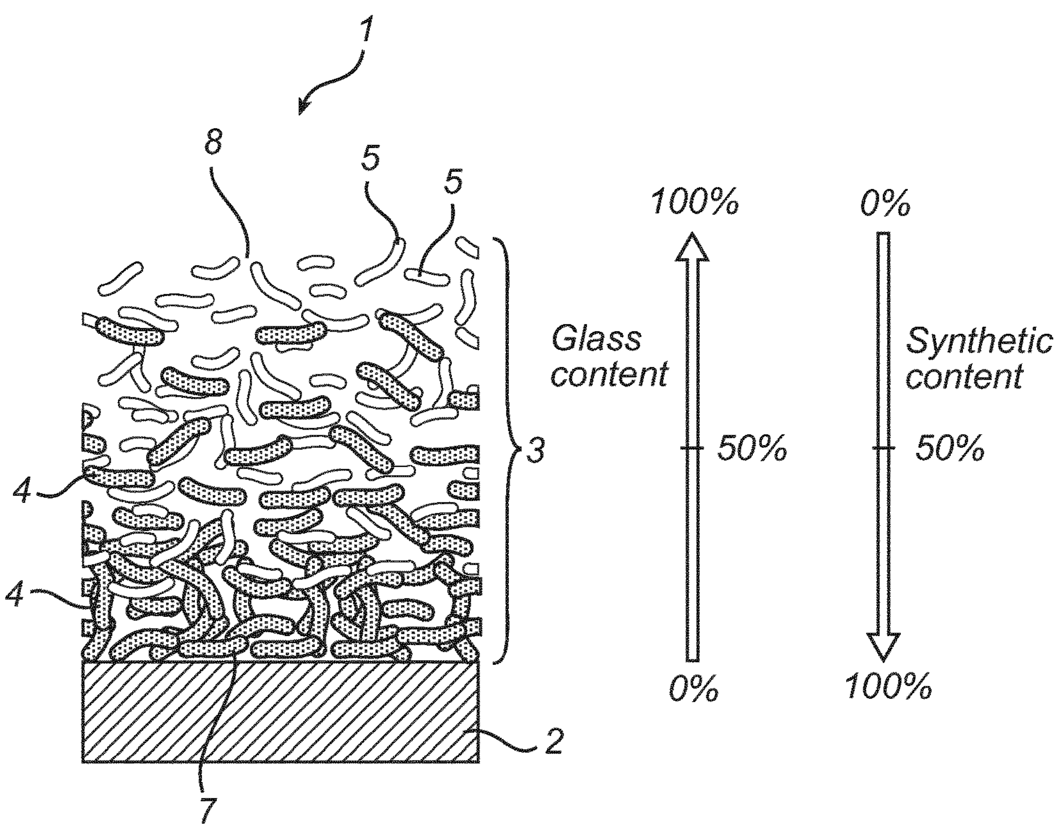
FIG. 4 is a schematic presentation of the fiber content distribution of a filter media according to the first embodiment of the invention

In a first embodiment of a filter media according to the invention, as shown in FIG. 1, a filter media 1 comprises a porous membrane layer 2. The membrane layer 2 could comprise an ePTFE-membrane or an UPE-membrane or an electro spun membrane made of fibers from a variety of polymers. The membrane 2 is laminated to a pre-filter media 3. This pre-filter media 3 is intended to protect the membrane 2 from mechanical damage and prevent larger particles from reaching the upstream surface of the membrane, thus preventing or at least reducing clogging of the membrane 2. The pre-filter layer comprises a downstream surface 7 with which the pre-filter layer 2 is laminated to an upstream surface of the membrane 2. The pre-filter layer 2 comprises two types of fibers divided in two somewhat overlapping layers 9 and 10. The upstream layer 10 comprises a majority of glass fibers 5 and the downstream layer 9 comprises a majority of synthetic fibers 4. It should be noted that these layers are not divided by a well defined boundary, instead they overlap each other to a certain extent. This is due to the fact that the pre-filter layer is manufactured in a wet laying process so that fibers of an overhead layer will reach into an underlying layer. This manufacturing process can also be used to create a pre-filter media where the distribution of the fibers varies linearly from one point in the pre-filter media to another. For example, it would be possible to create a filter media as described in FIG. 4 where, at the downstream surface 7, the content of synthetic fibers 4 constitute 100% of the total amount of fibers at the downstream surface and where the content of synthetic fibers 4 decline linearly towards the upstream surface 8 of the pre-filter 3 where the synthetic fibers 4 constitute 0% of the total amount of fibers at the upstream surface 8. The amount of glass fibers 5 follows a reverse linear distribution, i.e. 0% at the downstream 7 surface and 100% at the upstream surface 8 of the pre-filter 3. This is a theoretical build-up, but one that could very well be realized with the wet laying process. The embodiment disclosed in FIG. 1 has a somewhat more distinct border between an upstream layer 10 comprising a majority of glass fibers 5 in a downstream layer 9 comprising a majority of synthetic fibers 4. But a certain mixing of glass fibers 5 and synthetic fibers 4 will occur in the mixing zone 11. Of course, a number of different structures are conceivable, e.g. an absolute mixture with 50-50% glass and synthetic fibers throughout the whole thickness of the pre-filter layer; any number of separate layers of glass fibers and synthetic fibers having any suitable thickness respectively or; different layers having different thicknesses and mixtures and distribution of glass and synthetic fibers. One possible structure is shown in FIG. 2 where a membrane 2 is laminated to a downstream surface 7 of pre-filter layer 3. The pre-filter layer 3 comprises a lower layer of synthetic fibers 9 and an upper layer of synthetic fibers 9' as well as an intermediate layer 10 of glass fibers interposed there between. The provision of two layers 9, 10 of synthetic fibers creates a pre-filter layer which prevents damages to the membrane by the sharp glass fibers 5 of layer 10 while protecting said glass fibers 5 from damage during e.g. handling of the filter media 1. The synthetic fibers 4 provides good structural behavior, also in wet conditions and provides for good particle retention while the interposed layer 10 of glass fibers ensures good mechanical filtration properties without having to rely on electrostatic charge of the fibers.

Figure 3:
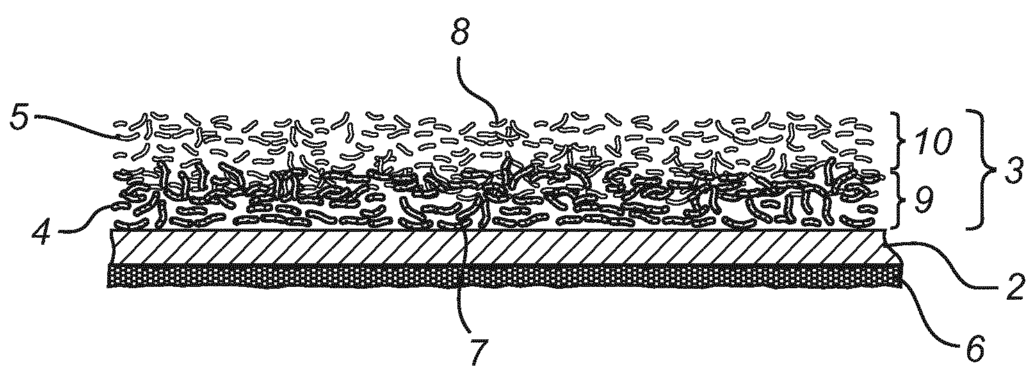
FIG. 3 is a schematic cross-section of a third embodiment of the filter media according to the invention.

FIG. 3 shows a filter media which corresponds to that of FIG. 1 where a supporting layer 6 has been provided at a downstream surface of the membrane 2. This supporting layer 6 provides for additional structural stability to the filter media 1 and serves to protect the downstream surface of the membrane 2 from damage, e.g. during pleating or during mounting of the pleated filter media 1 in a frame or similar. The supporting layer 6 can comprise a number of different materials such as a wet-laid layer of cellulose, synthetic or glass fibers or combinations thereof. Spun bound, air laid or woven materials are also conceivable. The thickness of such support layer 6 ranges between 0.1-10 mm, typically between 0.1-2 mm. Additionally, if fibers are used in the support layer that may damage the membrane, e.g. glass fibers, it is possible to use an intermediate layer made of e.g. fabric as well to protect the membrane (not shown in the figures). Of course, the use of a support layer 6 could be realized in combination with any type of pre-filter layer mentioned herein, such as the ones described in FIGS. 2 and 4.

Finally, it is realized that the use of a pre-filter layer having a combination of glass fibers and synthetic fibers uses the advantages of both fiber types. Consequently, the synthetic fibers provide good particle retention properties and good structural stability, also in moist environments, to the filter and prevent collapsing of e.g. a pleated filter media. A collapse can sometimes occur when using filters with only, or a very high share of, fine fibers such as glass fibers in moist environments. A collapse of this type will give a permanent deformation of the filter media causing adjacent pleats to come in contact with each other thereby reducing air flow and increasing pressure drop over the filter. On the other hand, glass fibers have better particle separating properties than synthetic fibers. The structure of the pre-filter according to the present invention creates a 3-dimensional, heterogeneous structure that disperses the collected particles over the entire depth of the pre-filter so that the increase in pressure drop over time is reduced. Furthermore, it has been shown that this pre-filter layer has advantages over the prior art when it comes to filtration characteristics when used in environments where it is exposed to high salt contents, e.g. off-shore gas turbines. In this type of environment the filters are exposed to an aerosol comprising salt particles suspended in air. The salt particles are absorbed and retained by the fibers of the pre-filter layer. Also salt particles dissolved in water droplets in the air will deposit on the fibers of the pre-filter media and when the water eventually evaporates the salt particles will remain on the surface of the fibers of the pre-filter layer. The salt particles will shrink and expand with varying air humidity. Below approximately 40% relative humidity, the salt particles will not shrink further but with increasing humidity, the salt particles will expand up to 5-10 times compared to its dry size. Variations in air humidity will therefore cause the pressure drop over the filter to vary greatly. Laboratory tests have been performed where the pre-filter media of the present invention has been subjected to salt and a following cycle of moistening and drying and where the pressure drop over the filter has been monitored. These tests have shown that the pressure drop after a subsequent cycle of moistening and drying will actually be lower than before the moistening. A filter media according to the present invention therefore combines the best of these fiber types and relies on mechanical filtration rather than electrostatic filtration. This provides consistent filtration characteristics in comparison with filter media relying on electrostatically charged fibers. It provides a filter that is strong, tear resistant, long working life, good humidity characteristics and with excellent characteristics in salt environments. It combines low pressure drop with high filtering efficiency and enables lamination to the membrane without damaging it.

The invention claimed is:

1. Multilayer filter media for removing particles from an air stream, said filter media comprising:

a porous membrane layer; and a pre-filter layer including a downstream surface and an upstream surface, the downstream surface being adjacent an upstream side of the porous membrane layer and wherein said pre-filter layer comprises a wet laid composite media including a mixture of glass fibers and synthetic fibers, and wherein a first ratio of a first amount of synthetic fibers in a first plane parallel to said downstream surface to a first total amount of fibers in the first plane decreases from the downstream surface of the pre-filter layer towards the upstream surface of said pre-filter layer.

2. Multilayer filter media according to claim 1, wherein the porous membrane layer is laminated to the pre-filter layer.

3. Multilayer filter media according to claim 1, wherein a supporting layer is laminated to a downstream side of the porous membrane layer.

4. Multilayer filter media according to claim 1, wherein a majority of the fibers at the downstream surface of the pre-filter layer are synthetic fibers.

5. Multilayer filter media according to claim 1, wherein a second ratio of the amount of synthetic fibers at the downstream surface of the pre-filter layer to the total amount of fibers at the downstream surface of the pre-filter layer is larger than 0.7.

6. Multilayer filter media according to claim 1, wherein a second ratio of the amount of synthetic fibers at the upstream surface of the pre-filter layer to the total amount of fibers at the upstream surface of the pre-filter layer is larger than 0.5.

7. Multilayer filter media according to claim 1, wherein, in a second plane parallel to said downstream surface, the second plane being centrally positioned between the downstream surface and the upstream surface of the pre-filter layer, a second ratio of the amount of synthetic fibers to a second total amount of fibers in the second plane is less than 0.5 and a ratio of an amount of glass fibers to the second total amount of fibers is larger than 0.5.

8. Multilayer filter media according to claim 1, wherein the glass fibers of the pre-filter layer have diameters between 0.01 μm and 50 μm.

9. Multilayer filter media according to claim 1, wherein the synthetic fibers of the pre-filter layer have diameters between 0.01 μm and 50 μm.

10. Multilayer filter media according to claim 1, wherein the pre-filter layer is not electrostatically charged.

11. Multilayer filter media according to claim 1, wherein the porous membrane layer comprises an ePTFE-membrane.

12. Multilayer filter media according to claim 1, wherein the porous membrane layer comprises an Ultra High Molecular Weight Polyethylene-membrane.

13. Multilayer filter media according to claim 1, wherein the porous membrane layer comprises a membrane of spun bound polymer fibers.

14. Multilayer filter media according to claim 8, wherein the glass fibers of the pre-filter layer have diameters between 0.1 μm and 0.5 μm.

15. Multilayer filter media according to claim 9, wherein the synthetic fibers of the pre-filter layer have diameters between 0.5 μm and 50 μm.

16. Multilayer filter media according to claim 1, wherein the first ratio of the first amount of synthetic fibers in a first plane parallel to said downstream surface to the first total amount of fibers in the first plane is lower than a second ratio of a second amount of synthetic fibers in a second plane parallel to the downstream surface to a second total amount of fibers in the second plane and is lower than a third ratio of a third amount of synthetic fibers in a third plane parallel to the downstream surface to a third total amount of fibers in the third plane, the second ratio being lower than the third ratio.

17. Multilayer filter media according to claim 1, wherein a first content of glass fibers increases from the downstream surface toward the upstream surface and a second content of synthetic fibers decreases from the downstream surface toward the upstream surface.

* * * * *